United States Patent
Zheng et al.

(10) Patent No.: US 10,495,388 B1
(45) Date of Patent: Dec. 3, 2019

(54) THERMAL ENERGY STORAGE SYSTEM WITH TUNABLE PHASE CHANGE COMPOSITION

(71) Applicant: ADVANCED COOLING TECHNOLOGIES, INC., Lancaster, PA (US)

(72) Inventors: Ying Zheng, Lancaster, PA (US); Chien-Hua Chen, Lititz, PA (US); Howard Pearlman, Haddon Township, NJ (US); Richard Bonner, III, Lancaster, PA (US); Fangyu Cao, Alexandria, VA (US)

(73) Assignee: ADVANCED COOLING TECHNOLOGIES, INC., Lancaster, PA (US)

( * ) Notice: Subject to any disclaimer, the term of this patent is extended or adjusted under 35 U.S.C. 154(b) by 58 days.

(21) Appl. No.: 15/689,245

(22) Filed: Aug. 29, 2017

Related U.S. Application Data

(60) Provisional application No. 62/396,892, filed on Sep. 20, 2016.

(51) Int. Cl.
*F28D 20/02* (2006.01)
*C09K 5/06* (2006.01)

(52) U.S. Cl.
CPC ............. *F28D 20/02* (2013.01); *C09K 5/063* (2013.01)

(58) Field of Classification Search
CPC ................................ F28D 20/02; C09K 5/063
USPC ......................................................... 165/200
See application file for complete search history.

(56) References Cited

U.S. PATENT DOCUMENTS

| | | | |
|---|---|---|---|
| 4,540,502 A | 9/1985 | Kimura | |
| 4,585,573 A | 4/1986 | Yanadori et al. | |
| 4,637,888 A * | 1/1987 | Lane | C09K 5/063 252/70 |
| 5,085,790 A | 2/1992 | Hormansdorfer | |
| 7,500,593 B2 | 3/2009 | Mayer | |
| 7,897,953 B2 | 3/2011 | Liu | |
| 7,967,999 B2 | 6/2011 | Tomura | |
| 8,709,834 B2 | 4/2014 | Hong et al. | |
| 2011/0017944 A1 * | 1/2011 | Houbertz-Krauss | B01J 13/14 252/70 |
| 2014/0124158 A1 * | 5/2014 | Yamashita | F25D 11/006 165/10 |
| 2016/0122115 A1 * | 5/2016 | Peppou | B01D 53/28 62/4 |

* cited by examiner

*Primary Examiner* — Joel M Attey
(74) *Attorney, Agent, or Firm* — McNees Wallace & Nurick LLC

(57) ABSTRACT

A thermal energy storage system includes a phase change composition including a phase change material. The phase change composition has a first melting temperature at a first hydration level and a second melting temperature at a second hydration level. The phase change composition stores thermal energy by converting from a solid to a liquid. The thermal energy storage system also includes at least one compartment containing the phase change composition and at least one tuning medium receiving water to adjust the phase change composition from the first hydration level to the second hydration level and supplying water to adjust the phase change composition from the second hydration level to the first hydration level. A method of storing and releasing thermal energy is also disclosed.

19 Claims, 6 Drawing Sheets

THERMAL ENERGY STORAGE SYSTEM WITH TUNABLE PHASE CHANGE COMPOSITION

CROSS-REFERENCE TO RELATED APPLICATIONS

This application claims priority to and the benefit of U.S. Provisional Application No. 62/396,892, filed on Sep. 20, 2016, and entitled "PHASE CHANGE MATERIAL WITH TUNABLE PHASE CHANGE TEMPERATURE", the disclosure of which is hereby incorporated by reference in its entirety.

STATEMENT REGARDING FEDERALLY SPONSORED RESEARCH

This invention was made with Government support under contract number DE-AR0000582, awarded by the Advanced Research Projects Agency-Energy of the Department of Energy. The Government has certain rights in the invention.

FIELD OF THE INVENTION

The present invention is directed to thermal energy storage. More particularly, the present invention is directed to methods and systems for thermal energy storage with temperature-tunable phase change materials.

BACKGROUND OF THE INVENTION

More than 86% of electricity in the U.S. is produced in thermoelectric power generating plants, most of which use coal, natural gas, or nuclear power to generate thermal energy. The thermal energy drives steam turbines to produce electrical power, and typically, more than 60% of the original energy is wasted and dissipated as low-grade heat. Operators must remove this heat, and 99% of baseload thermoelectric plants in the U.S. use water-cooled systems, or wet cooling, to do so. As a result, wet-cooling systems at power plants currently account for 41% of all freshwater withdrawals in the U.S. Since availability of freshwater resources is increasingly strained by drought and growing demand, and potential climate change impacts add uncertainty to the quality and quantity of future water supplies, dry-cooling systems (air-cooled condensing) have therefore received increased attention. In these systems, however, the air temperature tends to be warmer than the water temperature, and air has a substantially smaller cooling capacity compared with that of water. As a result, current dry-cooling technologies are less effective in cooling the steam in power plants, thus leading to a reduction in the efficiency of power generation compared with that for water-cooled generators. Specifically, during hot ambient temperatures, the efficiency of an air-cooled condenser is lower, because the temperature difference between the air and the steam is low. As a result, power plants are overdesigned with respect to air-cooled condenser cooling capacity, so they can handle the highest ambient temperatures. Unfortunately, this dramatically increases the capital cost of dry cooling systems.

Thermal energy storage systems store and release thermal energy by heating or cooling the thermal storage medium so that the stored energy may be used at a later time for heating, cooling, or power generation applications. By storage mechanism, the storage technology may be classified into three groups: sensible heat storage systems, latent heat storage systems, and thermochemical storage systems.

Sensible heat storage systems store and release thermal energy by a temperature increase or decrease of the storage medium. The storage medium may be a liquid, a solid, or a gas. Conventional sensible heat storage materials include water, molten salt, sand, rock, concrete, and metals.

Latent heat storage systems store and release thermal energy in the latent heat of the storage material, which undergoes a phase change. The phase change may be a solid-liquid phase change or a liquid-gas phase change. Conventional phase change materials (PCMs) include hydrated salts, paraffin waxes, fatty acids, and eutectics of organic and non-organic compounds.

Thermochemical storage systems store and release thermal energy by reversible exothermic and endothermic reactions. The main principle of thermochemical energy storage is based on the chemical reaction: C+heat$\leftrightarrow$A+B. In this reaction, the thermochemical storage medium C absorbs heat and is converted chemically into components A and B. The reverse reaction occurs when materials A and B react to form C with the release of heat. Several types of reactions have been investigated for storage of thermal energy, including dehydration, metal hydroxides, and metal oxides. Conventional thermochemical storage materials include magnesium sulfate heptahydrate ($MgSO_4 \cdot 7H_2O$), ferrous carbonate ($FeCO_3$), calcium hydroxide ($Ca(OH)_2$), and manganese dioxide ($MnO_2$).

Phase change materials have received substantial attention for thermal energy storage, since such materials are readily available, may be inexpensive to obtain, and have a relatively high heat storage capacity. When choosing phase change material candidates, the importance of various criteria may vary on a case-by-case basis. General guidelines to follow may include having a thermal storage system with desirable heat transfer performance that is stable through repeated thermal cycling and available at a reasonable cost. Significant research and development has been focused on using paraffin materials as well as salt hydrates. Salt hydrates are a group of inorganic materials that are inexpensive, have a relatively high thermal conductivity, and are environmentally friendly.

BRIEF DESCRIPTION OF THE INVENTION

In an exemplary embodiment, a thermal energy storage system includes a phase change composition including a phase change material. The phase change composition has a first melting temperature at a first hydration level and a second melting temperature at a second hydration level. The phase change composition stores thermal energy by converting from a solid to a liquid. The thermal energy storage system also includes at least one compartment containing the phase change composition and at least one tuning medium receiving water to adjust the phase change composition from the first hydration level to the second hydration level and supplying water to adjust the phase change composition from the second hydration level to the first hydration level.

In another exemplary embodiment, a method stores and releases thermal energy. The method includes applying a first season heat load to a phase change composition at a first hydration level during a first season. The phase change composition at the first hydration level has a first melting temperature and at a second hydration level has a second melting temperature. The first season has an average nighttime temperature below the first melting temperature but above the second melting temperature. The first season heat load melts the phase change composition to store thermal energy. The method also includes regenerating the phase change composition at the first hydration level during the first season by releasing thermal energy from the phase change composition to ambient at nighttime and adjusting the phase change composition from the first hydration level to the second hydration level. The method further includes applying a second season heat load to the phase change composition at the second hydration level during a second season. The second season has an average nighttime temperature below the second melting temperature. The second season heat load melts the phase change composition to store thermal energy. The method further includes regenerating the phase change composition at the second hydration level during the second season by releasing thermal energy from the phase change composition to ambient at nighttime and adjusting the phase change composition from the second hydration level to the first hydration level.

Other features and advantages of the present invention will be apparent from the following more detailed description, taken in conjunction with the accompanying drawings, which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are methods and systems for thermal energy storage with temperature-tunable phase change materials.

Embodiments of the present disclosure, for example, in comparison to similar processes and systems that do not include one or more of the features disclosed herein, increase the operating range of a thermal energy storage system without using different phase change materials, permit thermal energy storage over a wider range of ambient temperatures, decrease the costs due to efficiency loss in a thermal energy storage system, or a combination thereof.

Systems and processes tune phase change compositions between different forms with different melting temperatures, so that the melting point of the phase change composition is changed according to the ambient temperature for regeneration and continuous operating. The capability of tuning the phase change composition to different values enables its usage at different ambient nighttime temperatures, thus accommodating the varying ambient temperatures between the seasons. In some embodiments, the difference between the two melting temperatures is at least 10° C. (18° F.).

Figure 1:
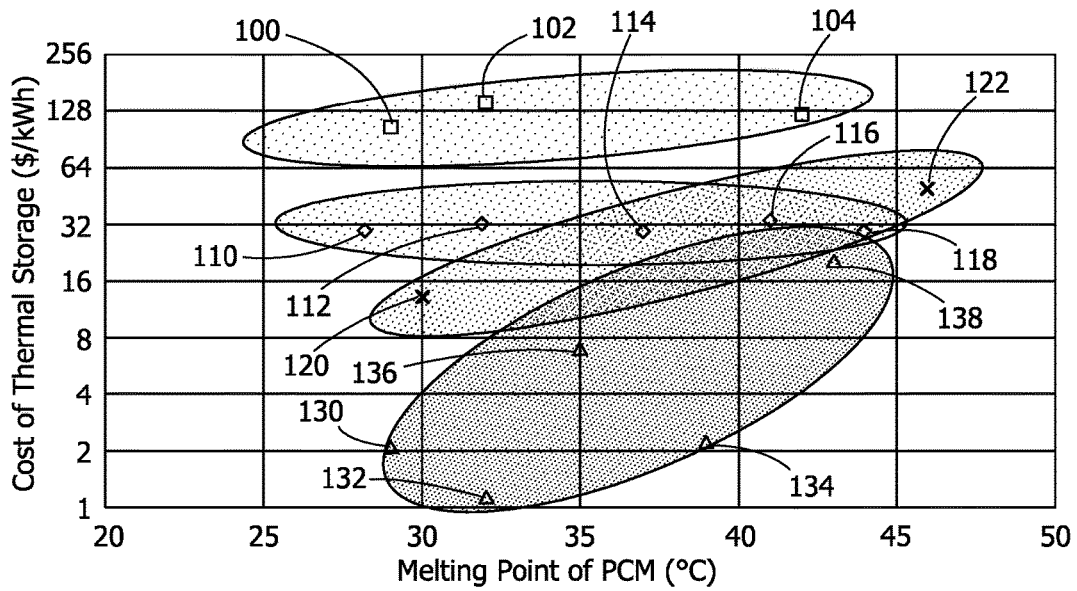
FIG. 1 shows the cost of certain phase change materials relative to their storage capacity.

Types of phase change materials (PCMs) include non-paraffinic fatty acids and fatty esters, paraffin waxes, eutectics, and salt hydrates. FIG. 1 shows that over a melting point range of about 30° C. to about 45° C., the cost per unit thermal storage of non-paraffins methyl palmitate 100, capric acid 102, and lauric acid 104 is higher than the cost per unit thermal storage of the paraffins $C_{18}H_{38}$ 110, $C_{19}H_{40}$ 112, $C_{20}H_{42}$ 114, $C_{21}H_{44}$ 116, and $C_{22}H_{46}$ 118 and the eutectics $Ca(NO_3)_2 \cdot 4H_2O/Mg(NO_3)_2 \cdot 6H_2O$ 120 and $NH_2CONH_2/NH_4NO_3$ 122. The cost per unit thermal storage of salt hydrates $CaCl_2 \cdot 6H_2O$ 130, $Na_2SO_4 \cdot 10H_2O$ 132, $CaCl_2 \cdot 4H_2O$ 134, $Na_2SO_4 \cdot 12H_2O$ 136, $Ca(NO_3)_2 \cdot 4H_2O$ 138 is the lowest of these four groups of PCMs.

TABLE 1

Thermal Properties of Calcium Chloride Salt Hydrates

| Property | $CaCl_2 \cdot 6H_2O$ | $CaCl_2 \cdot 4H_2O$ | $CaCl_2 \cdot 2H_2O$ | $CaCl_2 \cdot H_2O$ | $CaCl_2$ |
|---|---|---|---|---|---|
| Wt.% $CaCl_2$ | 50.66 | 60.63 | 75.49 | 86.03 | 100 |
| Molecular Weight (g/mol) | 219.09 | 183.05 | 147.02 | 129.00 | 110.99 |
| Melting Point[1] | | | | | |
| (° C.) | 29.9 | 45.3 | 176 | 187 | 773 |
| (° F.) | 85.8 | 113.5 | 349 | 369 | 1424 |
| Boiling Point[2] | | | | | |
| (° C.) | — | — | 174 | 183 | 1935 |
| (° F.) | — | — | 345 | 361 | 3515 |
| Density at 25° C. (g/cm³) | 1.71 | 1.83 | 1.85 | 2.24 | 2.16 |
| Heat of Fusion | | | | | |
| (cal/g) | 50 | 39 | 21 | 32 | 61.5 |
| (Btu/lb) | 90 | 70 | 38 | 58 | 110.6 |
| Heat of Solution[3] (cal/g) | 17.2 | −14.2 | −72.8 | −96.8 | −176.2 |
| to infinite dilution (Btu/lb) | 31.0 | −25.6 | −131.1 | −174.3 | −317.2 |

TABLE 1-continued

Thermal Properties of Calcium Chloride Salt Hydrates

| Property | CaCl$_2$•6H$_2$O | CaCl$_2$•4H$_2$O | CaCl$_2$•2H$_2$O | CaCl$_2$•H$_2$O | CaCl$_2$ |
|---|---|---|---|---|---|
| Heat of Formation[3] at 25° C. (kcal/mole) | −623.3 | −480.3 | −335.58 | −265.49 | −190.1 |
| Heat capacity at 25° C. (cal/g·° C.) | 0.34 | 0.32 | 0.28 | 0.20 | 0.16 |

[1]Incongruent melting point for hydrates.
[2]Temperature where dissociation pressure reaches 1 Atm for hydrates.
[3]Negative sign indicates an exothermic process (heat is evolved).

Salt hydrates are a class of inorganic materials that contain a certain amount of water of hydration. The formula is usually noted as "hydrated compound nH$_2$O", where n is the number of water molecules per formula unit of the salt. A salt with multiple hydrates each having a different amount of water molecules possesses different melt points. For example, calcium chloride (CaCl$_2$) hydrates include a monohydrate, a dihydrate, a tetrahydrate, and a hexahydrate. As shown in Table 1, the lower the water content, the higher the melting point for a hydrated salt series. Calcium chloride hexahydrate has a phase change at 29.9° C. (85.8° F.), and calcium chloride tetrahydrate has a phase change at 45.3° C. (113.5° F.). The amount of water content in the salt depends on the hydrated compound itself and the relative humidity at a given environment temperature.

As seen in Table 1, the thermal properties of those two calcium hydrates are otherwise very similar. Considering a 10° C. temperature swing at the melting point, the storage capacity per volume for CaCl$_2$.6H$_2$O is about 91.3 cal/cm$^3$ ((50 cal/g+0.34 cal/g·° C.×10° C.)×1.71 g/cm$^3$) and CaCl$_2$.4H$_2$O is about 77.2 cal/cm$^3$ (39 cal/g+0.32 cal/g·° C.×10° C.)×1.83 g/cm$^3$). Therefore, only an additional 15% more volume of salt hydrate is required to maintain the same storage capacity of the storage system after the material is tuned by dehydrating from CaCl$_2$.6H$_2$O to CaCl$_2$.4H$_2$O.

In the storage of thermal energy, the phase change material (PCM), in this case a salt hydrate, captures the heat from the heat source and stores the heat in the material itself as it undergoes a phase change from solid to liquid at its phase change temperature. To regenerate the salt hydrate by returning it to a solid state such that it may be repeatedly used, the stored heat is dissipated to a heat sink having a temperature lower than the solidification point of the salt hydrate. Significant research taking advantage of this melting-regeneration process of phase change materials has been done with a goal of capturing excess heat from the system and shifting an energy demand.

Hydratable salts suitable as a phase change material may include, but are not limited to, LiClO$_3$, K$_2$HO$_4$, KF, Mn(NO$_3$)$_2$, LiBO$_2$, FeBr$_3$, CaCl$_2$, LiNO$_3$, Na$_2$SO$_4$, Na$_2$CO$_3$, KFe(SO$_4$)$_2$, CaBr$_2$, LiBr, Na$_2$HPO$_4$, Zn(NO$_3$)$_2$, FeCl$_3$, CoSO$_4$, CuSO$_4$, MgI$_2$, CaI$_2$, Ca(NO$_3$)$_2$, K$_3$PO$_4$, Fe(NO$_3$)$_3$, Na$_2$SiO$_3$, Na$_2$S$_2$O$_3$, K$_2$HPO$_4$, MgSO$_4$, Co(NO$_3$)$_2$, Ni(NO$_3$)$_2$, MnCl$_2$, CH$_3$COONa, LiCH$_3$COO, MgCl$_2$, NaCH$_3$COO, Cd(NO$_3$)$_2$, Fe(NO$_3$)$_2$, NaAl(SO$_4$)$_2$, FeSO$_4$, Na$_3$PO$_4$, Na$_2$B$_4$O$_7$, Na$_2$P$_2$O$_7$, Al(NO$_3$)$_2$, Ba(OH)$_2$, Al$_2$(SO$_4$)$_3$, Sr(OH)$_2$, Mg(NO$_3$)$_2$, KAl(SO$_4$)$_2$, (NH$_4$)Al(SO$_4$), Na$_2$S, and LiCl.

In some embodiments, the phase change composition is a mixture of two or more non-water components. In some embodiments, the mixture includes NaCl and KCl in a phase change composition with water. In some embodiments, the mixture includes Na$_2$SO$_4$, NaCl, and KCl in a phase change composition with water. In some embodiments, the phase change composition is a mixture of Na$_2$SO$_4$ and NaCl in a phase change composition with water. In such embodiments, the hydration level is the percentage of water in the phase change composition, and the melting point is tuned by adjusting the percentage of water in the phase change composition.

Figure 2:
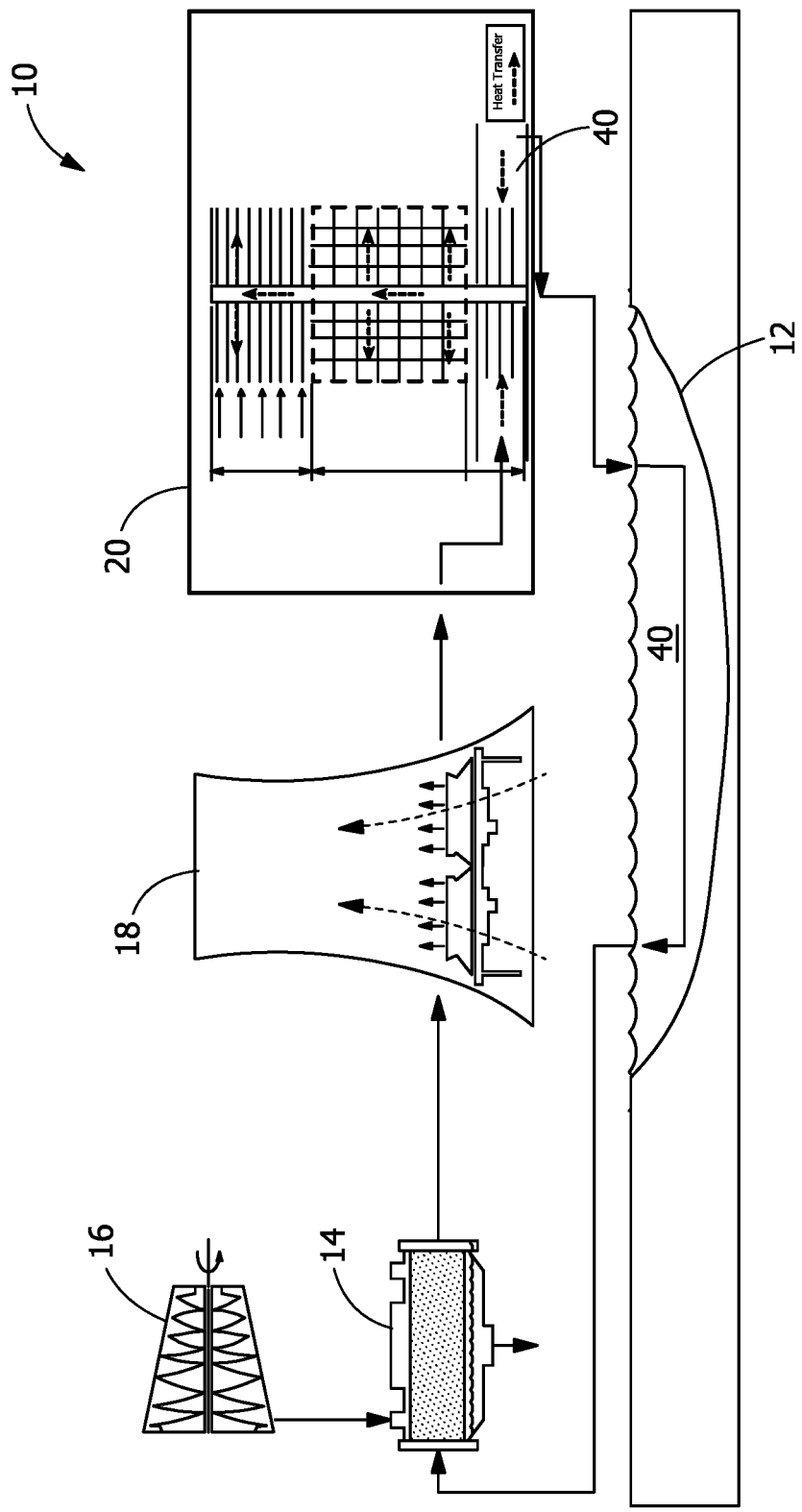
FIG. 2 shows a schematic thermal energy storage system for dry cooling in a power plant using a phase change material.

Referring to FIG. 2, one application for a salt hydrate phase change material is in a dry cooling system 10. Cooling water 40 from a water reservoir 12 flows through a condenser 14 to condense steam from a turbine 16, for example. The now-heated cooling water 40 flows across an air-cooled heat exchanger 18 before entering the thermal energy storage system 20. Upon leaving the thermal energy storage system 20, the cooled cooling water 40 returns to the water reservoir 12.

Figure 3:
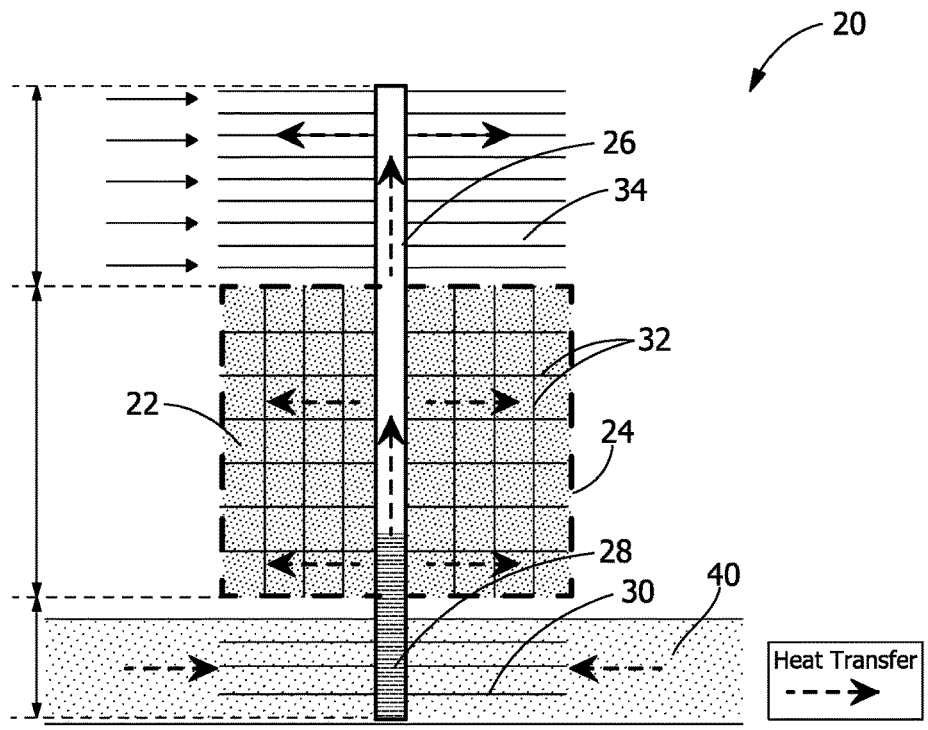
FIG. 3 shows a flow diagram of a thermal energy storage system to capture excess heat from a power plant using a phase change material.

During the daytime, as shown in FIG. 3, the cooling water 40, received by the thermal energy storage system 20 after leaving the air-cooled heat exchanger 18, flows across the thermal energy storage system 20, transferring excess heat to the phase change composition 22 (and to ambient, if ambient is cooler than the cooling water) and thus being cooled down before circulating back to the water reservoir 12 and ultimately to the condenser 14 to capture additional heat from the steam. The phase change composition 22 transforms from a solid to a liquid to store the excess thermal energy.

The thermal energy storage system 20 further includes a compartment 24 holding the phase change composition 22, a heat pipe 26 circulating a heat transfer fluid 28, cooling water fins 30 aiding in the transfer of thermal energy from the cooling water 40 to the heat transfer fluid 28, phase change fins 32 aiding in the transfer of thermal energy from the heat transfer fluid 28 to the phase change composition 22, and ambient fins 34 aiding in the transfer of thermal energy from the heat transfer fluid 28 to ambient.

Figure 4:
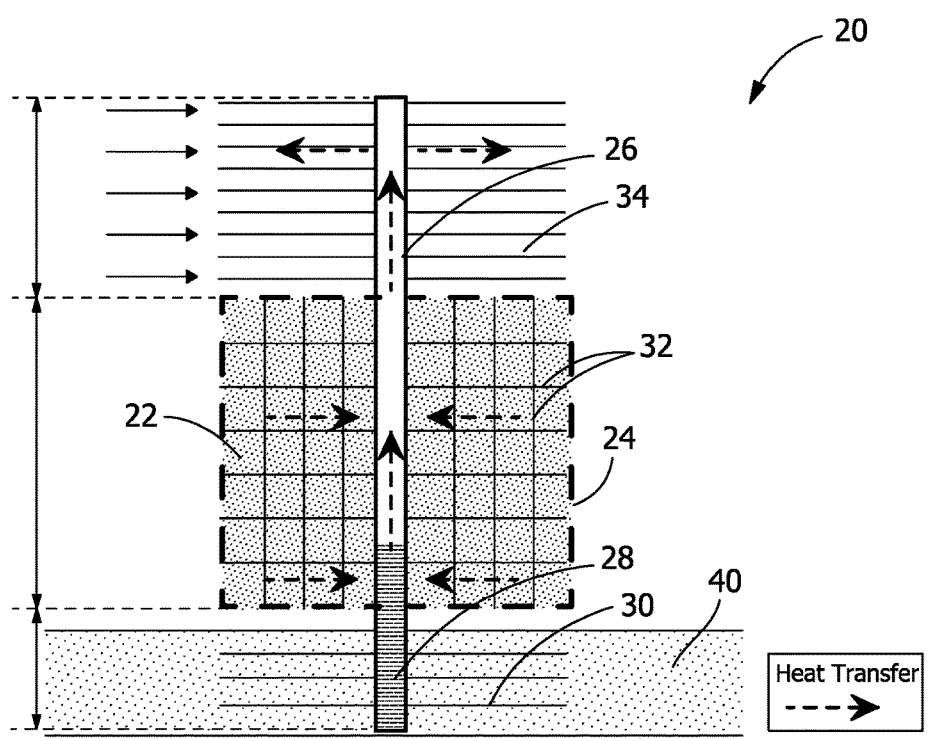
FIG. 4 shows a flow diagram of a thermal energy storage system showing regeneration of the phase change material.

During the nighttime, as shown in FIG. 4, the phase change composition 22 of the thermal energy storage system 20 is thermally isolated from the cooling water loop, since the air-cooled heat exchanger 18 is capable of dissipating all of the heat from the cooling water with the cooler ambient temperature and lower heat load. During this time, the excess thermal energy stored in the phase change composition 22 is transferred to its heat sink (ambient) by way of the heat transfer fluid 28, and the phase change composition 22 is regenerated by cooling and solidifying. Based on this principle, it is desirable for the phase change temperature (i.e. melting point) of the phase change composition 22 to not be higher than the cooling water temperature (for energy extraction), and not be less than the nighttime ambient temperature (for regeneration). A desirable phase change temperature for the phase change composition 22 may change as the nighttime ambient temperature varies with season.

Although the thermal energy storage system 20 of FIG. 2, FIG. 3, and FIG. 4 includes a heat transfer fluid 28 as an intermediate that receives a heat load from the cooling water 40 and provides the heat load to the phase change composition 22, the cooling water 40 may alternatively be in a direct heat exchange relationship with the phase change composition 22 without any intermediate fluid.

Figure 5:
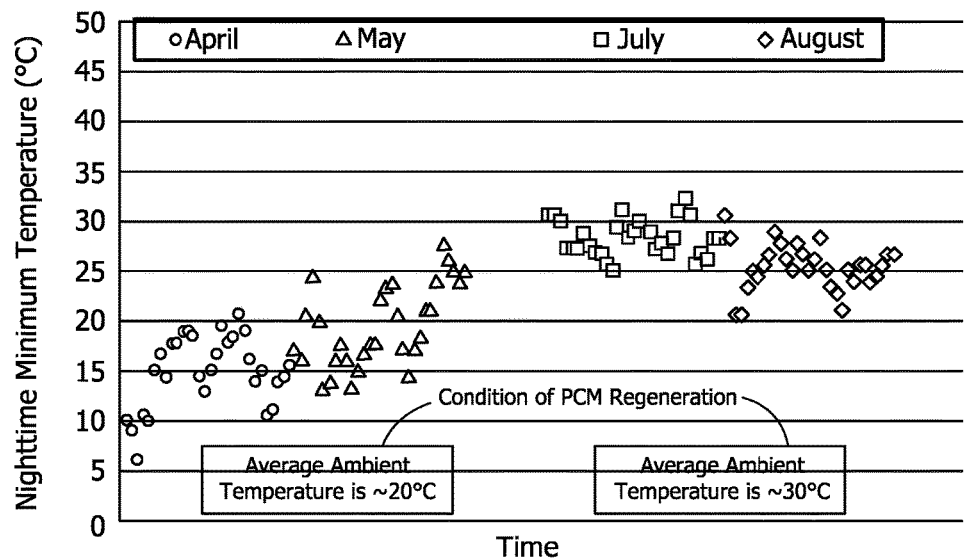
FIG. 5 shows a chart of average nighttime temperatures in Las Vegas in April, May, July, and August.

Referring to FIG. 5, in Las Vegas, Nev., for example, the ambient temperature during the night in the spring may be lower than, and optimal for, the phase change temperature of the phase change composition 22 such that the phase change composition 22 is able to dissipate its stored heat to the ambient and regenerates by solidification. Still referring to FIG. 5, however, the ambient temperature during the night in the summer may be higher and warmer than the phase change temperature of the phase change composition 22 such that the phase change composition 22 is not able to dissipate its stored heat to the ambient and cannot be regenerated by solidification. A phase change composition 22 with an optimal phase change temperature for regeneration during the summer, however, may have the opposite problem in the spring of not receiving sufficient heat load from the cooling water during the day to be able to extract and store energy by transforming into a liquid.

To address this regeneration challenge and ensure continuous operation of the thermal energy storage system 20, one approach is to use multiple compartments 24, each with a phase change composition 22 having a different melting temperature. In the seasons when the nighttime temperature is lower than the phase change material temperature, the thermal energy storage system 20 can be operated as described previously, with all the phase change composition 22 undergoing phase change in the daytime to capture the heat from the cooling water, then being regenerated (solidified) at night by rejecting the heat to the ambient. In the hot seasons, a phase change composition 22 with a high melting point melts as it captures heat from the cooling water 40 and is regenerated for continuous usage for the next thermal cycle. However, a phase change composition 22 with too low of a melting point is not able to be regenerated at night, thus it remains liquid all the time during summer, and is only used for sensible heating and cooling without any phase change. In that case, the overall storage capacity of the thermal energy storage system 20 is decreased, thus requiring a larger amount of phase change compositions 22 and a larger storage tank of compartments 24.

To address this issue, the tuning of a phase change composition 22, such as, for example, a salt hydrate, permits the phase change composition 22 to have different melting points to accommodate the different temperature profiles of the heat sink or ambient at different times of the year. As discussed above, a salt hydrate may crystallize in different hydrate forms depending on the water content and each of these different forms has a different melting point. When the heat sink is cool, the phase change composition 22 in a first form (with a lower melting point) is regenerated. Then, when the heat sink is warm and its temperature is higher than the solidification point of the phase change material in the first form, the phase change composition 22 is tuned to a second form with a higher melting point by the removal of water from the phase change composition 22, to be solidified (regenerated).

In the dry cooling application described previously, in summer, the melting point of the phase change composition 22 may be increased such that it is higher than the nighttime air temperature available for solidification (regeneration). Then in seasons like spring and autumn, when the ambient temperature is cooler at night, the melting point of the phase change composition 22 may be decreased while the phase change composition 22 may still be regenerated successfully at a lower temperature. In addition, a large temperature difference between the phase change composition 22 and the cooling water 40 is maintained during the thermal energy extraction at daytime.

In some embodiments, a phase change material-based thermal energy storage system 20, as described in co-pending U.S. patent application Ser. No. 15/270,083, filed Sep. 20, 2016 and entitled "Heat Pipe—Thermal Storage Medium Based Cool Storage System", which is hereby incorporated by reference in its entirety, is used as a supplemental cooling system to take the excess heat during the excursion of a heat load, as shown previously in FIG. 2. During the daytime, the cooling water 40 leaving the air-cooled heat exchanger 18 flows across a thermal energy storage system 20 including a phase change composition 22 and excess heat is transferred to the phase change composition 22 (and ambient, if ambient is cooler than the cooling water 40). The cooling water 40 is thus cooled down prior to being circulated back to capture additional heat from the steam. During the nighttime, the air-cooled heat exchanger 18 is capable of dissipating all of the stored heat from the cooling water 40, because of the cooler ambient and lower heat load. During this time, the thermal energy storage system 20 is thermally isolated from the cooling water 40 loop, and the thermal energy stored in the phase change composition 22 is transferred to its heat sink—ambient, and the phase change composition 22 is solidified (regenerated) from a liquid. The phase change temperature (i.e. melting point) of the phase change composition 22 is preferably not more than the cooling water temperature (for energy extraction), and not less than the ambient temperature (for regeneration). However, the nighttime temperature varies with seasons. Referring to FIG. 5, for example, Las Vegas, Nev. has an average ambient temperature at night of about 20° C. in the months of April and May, while in July and August, it is warmer at night, with an average ambient temperature of about 30° C. If a phase change composition 22 with a melting point of 30° C. is chosen, the thermal energy storage system 20 can only be used for the months with a cool night, since in months like July and August, the phase change composition 22 cannot be regenerated. If choosing a phase change composition 22 with a higher melting point (for example, higher than 30° C. for the case of Las Vegas), the efficiency of the power plant during the day will be significantly lowered. A 3° C. rise in the steam condensation temperature is estimated to result in an about 1% reduction in power production from the turbine 16.

Figure 6:
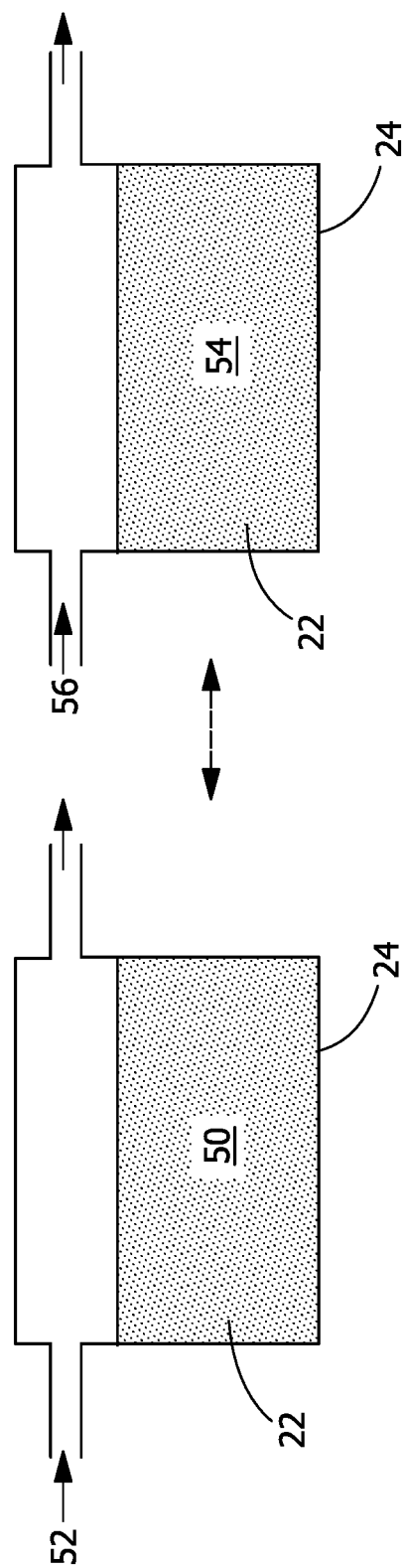
FIG. 6 shows a schematic diagram of tuning of the melting point of a salt hydrate phase change material.

In some embodiments, a process tunes a salt hydrate based storage medium to have a different melting point for storage of thermal energy. The tuning of such a thermal energy storage system 20 is shown in FIG. 6. This tuning may occur while the storage medium is in a solid state, a liquid state, or a partially-liquid, partially-solid state at the start of the tuning. A compartment 24 of a thermal energy storage system 20 is filled with a salt at a first hydration level 50 as the phase change composition 22, for energy storage and heat dissipation. As mentioned previously, for a given hydratable salt compound, the hydration level depends on the relative humidity and temperature. The process controls the relative humidity at a given temperature in the compartment 24 of the thermal energy storage system 20, thus tuning the hydration level of the hydrated salt. As shown in FIG. 6, a low humidity fluid 52 with controlled humidity flows into the compartment 24 to remove water from the salt to convert the salt at the first hydration level 50 as the phase change composition 22 to a salt at a second hydration level 54 as the phase change composition 22, where the second hydration level 54 is lower than the first hydration level. In some embodiments, the second hydration level 54 is a zero hydration level. As shown in FIG. 6, a high humidity fluid 56 flows into the compartment 24 to add water to the salt at the second hydration level 54 to convert from the salt at the second hydration level 54 to the salt at the first hydration level 50.

By controlling the amount of water content associated with the salt and hence the hydration level of the salt, the melting point of the phase change composition 22 is changed. The phase change composition 22 on the left in FIG. 6 has a lower melting point than the phase change composition 22 on the right. The low humidity fluid 52 with controlled humidity not more than that of the salt at a second hydration level 54 flows past the salt at a first hydration level 50 to take a specific amount of water out of the phase change composition 22, thereby tuning it to the salt at the second hydration level 54 with a higher melting point. A high humidity fluid 56 with controlled humidity not less than that of the salt at the first hydration level 50 flows past the salt at the second hydration level 54 to supply a specific amount of water to the phase change composition 22, thereby tuning it to the salt at the first hydration level 50 with a lower melting point.

Since the melting point ($T_{m,1}$) of the salt at the first hydration level 50 is lower than the melting point ($T_{m,2}$) of the salt at the second hydration level 54, the phase change composition 22 is maintained as the salt at the first hydration level 50 in the spring season, when the ambient is cooler and the nighttime temperature is lower than $T_{m,1}$, considering that in storing thermal energy, there is a larger temperature drive between the phase change point of the storage medium (the phase change composition 22) and the incoming cooling water 40.

In the summer, when the ambient is warmer and the nighttime temperature is higher than $T_{m,1}$ but lower than $T_{m,2}$ of the salt at the second hydration level 54, a low humidity fluid 52 with a controlled humidity not more than that of the salt at the second hydration level 54 is flowed past the salt at the first hydration level 50 to remove water content from the phase change composition 22. After a certain time, when the corresponding vapor pressure of the phase change composition 22 is the same as that of the salt at the second hydration level 54, the phase change composition 22 is fully tuned from the salt at the first hydration level 50 to the salt at the second hydration level 54. The salt at the second hydration level 54 possesses a lower water content and the higher melting point ($T_{m,2}$), and the phase change composition 22 can be solidified for continuous thermal energy storage and release during the hot summer nights.

When it goes to autumn and winter, the ambient become cool again. When the nighttime temperature drops below the melting point ($T_{m,1}$) of the salt at the first hydration level 50, it is thermally preferred to have a phase change composition 22 with a lower melting point considering a larger temperature drive between the salt at the first hydration level 50 and the cooling water 40. In that case, a high humidity fluid 56 with a humidity not less than that of the salt at the first hydration level 50 flows past the phase change composition 22 to bring in more water to increase the hydration of the phase change composition 22. When the vapor pressure of the phase change composition 22 is the same as that of the salt at the first hydration level 50, the phase change composition 22 is tuned completely from the salt at the second hydration level 54 to the salt at the first hydration level 50.

Therefore, the capability of tuning the phase change composition 22 between the salt at the first hydration level 50 and the salt at the second hydration level 54 having different melting points enables the usage of the thermal energy storage system 20 in different seasons through the year.

Referring to FIG. 6, FIG. 7, FIG. 8, and FIG. 9, the tuning medium 58, which may be a low humidity fluid 52 or a high humidity fluid 56, carries a specific amount of humidity and may include any carrier gas, such as air or nitrogen. As a high humidity fluid 56, the tuning medium 58 may alternatively be steam or liquid water when increasing the salt hydration. How fast the phase change composition 22 is tuned from one form to the other is determined by the mass transfer process of the water content between the tuning medium 58 and the phase change composition 22, which involves the humidity of the tuning medium 58, the flow rate of the tuning medium 58, the amount of the phase change composition 22, and the interaction of the tuning medium 58 and the phase change composition 22. The larger the difference between the relative humidity of the incoming tuning medium 58 and that of target phase change composition 22, the quicker this tuning process occurs. In addition, of course, the higher the flow rate of the tuning medium 58, the quicker it can take moisture out of the phase change composition 22 or bring in more water to the phase change composition 22. The size of the phase change composition 22 also greatly affects the rate of the tuning process, the length of the process increasing with an increase in the amount of the phase change composition 22. In some embodiments, the compartment 24 is not a monolithic block but rather has smaller units or particles of phase change composition 22, such as, for example, an encapsulated phase change composition 22 with a coating that is permeable to water.

Figure 7:
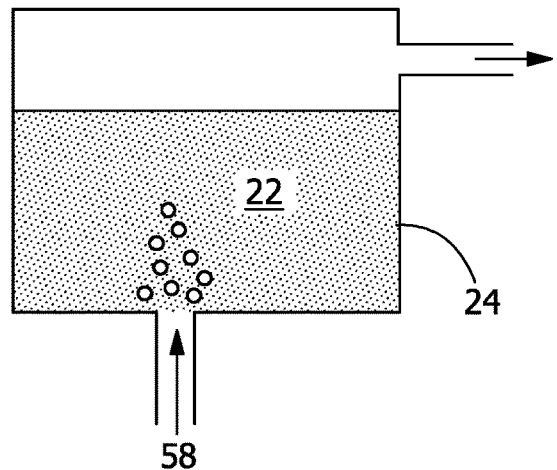
FIG. 7 shows fluid flowing and bubbling through a hydrated salt in a thermal energy storage system.

The interaction between the tuning medium 58 and the phase change composition 22 also affects the rate of this tuning process. As shown in FIG. 7, the tuning medium 58 may flow and bubble through the phase change composition 22. In this case, the tuning medium 58 has good contact with most of the phase change composition 22 for this mass transfer process. However, there may be carryover of the phase change composition 22 when the tuning medium 58 exits the compartment 24, which is undesirable.

Figure 8:
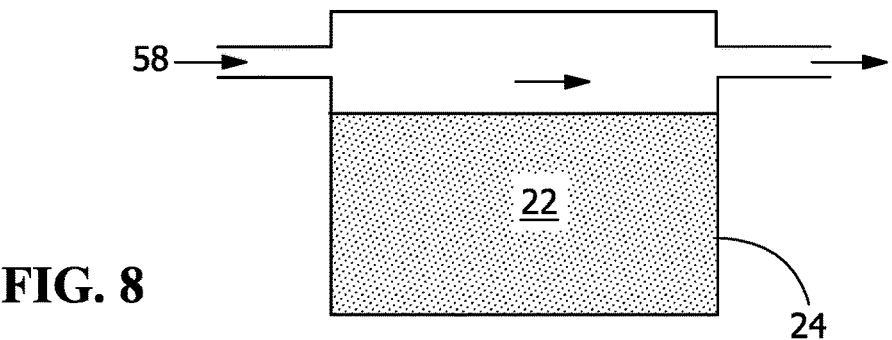
FIG. 8 shows fluid flowing above a hydrated salt in a thermal energy storage system.

As shown in FIG. 8, to alleviate this problem, the tuning medium 58 flows above the surface of the phase change composition 22. In this case, however, the water transfer between the tuning medium 58 and the lower section of the phase change composition 22 is by way of transfer through the upper section of the phase change composition 22. This tuning process reduces the amount of phase change composition 22 being carried away by the tuning medium 58, however, it is a relatively longer process, depending on the relative exposed surface of the phase change composition 22 to incoming tuning medium 58 per volume of the phase change composition 22, and any internal structure to enhance the mass transfer between incoming tuning medium 58 and the phase change composition 22, such as a fin stack that circulates the fluid internally for a longer retention time.

Figure 9:
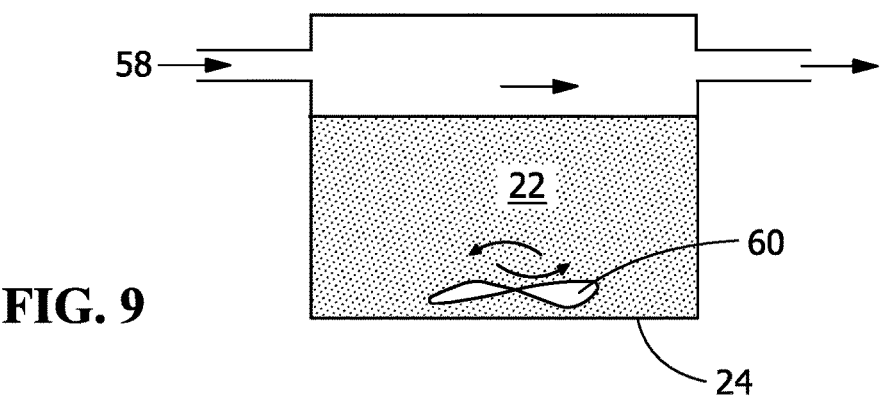
FIG. 9 shows an agitated hydrated salt for tuning of a phase change temperature in a thermal energy storage system.

As shown in FIG. 9, when a fast tuning process is needed or desirable, the phase change composition 22 may be agitated during the tuning process to improve the mass transfer of the water though the phase change composition 22. This agitation may be achieved by placing an agitator 60 in the compartment 24. When agitation of the phase change composition 22 is used, the phase change composition 22 is preferably in a liquid state from the start to the end of the tuning process so that mixing by the agitator 60 occurs throughout the tuning process.

In addition to or alternatively to having a tuning medium 58 carry moisture out of the phase change composition 22 as elaborated previously, a desiccant may be used to absorb part or all of the amount of water out of the phase change composition 22 to tune it to a form with lower hydration. A desiccant is a hygroscopic substance that induces or sustains a state of dryness in its vicinity by physically or chemically bonding with water molecules in the given environment. Suitable desiccants may include, but are not limited to, calcium chloride ($CaCl_2$), cobalt chloride ($CoCl_2$), silica gel ($SiO_2$), zeolites (aluminosilicates), and combinations thereof. The performance efficiency of the desiccant, defined as the ratio of the mass of water storable in the desiccant to the mass of the desiccant itself, depends on the physical and/or chemical properties of the desiccant material, such as, for example, the pore sizing and number for adsorption, such as, for example, silica gel. The performance efficiency depends on the temperature and humidity in the given environment and so may vary from one environment to another. The desiccant may be introduced into the phase change composition 22, either immersed into the phase change composition 22, or located above the phase change composition 22. The amount of a desiccant sufficient to tune $CaCl_2.6H_2O$ to its lower hydration form of $CaCl_2.4H_2O$, for example, depends on the ability of the chosen desiccant in absorbing the moisture at the given temperature and humidity. For a given desiccant, when the desiccant is located above the phase change composition 22, the relative humidity plays an important role in determining the amount of moisture that may be extracted out of the phase change composition 22, as well as the overall processing time.

In some embodiments, it may be a quicker process to dry the phase change composition 22 by immersing the desiccant in the phase change composition 22. In such cases, however, the desiccant is preferably carefully chosen so as to avoid any potential reaction with the phase change composition 22. In other words, the desiccant is preferably chemically inert to the phase change composition 22 to be tuned. The addition of the desiccant may also affect the overall storage capacity of the phase change composition 22, if it is not removed after tuning.

Figure 10:
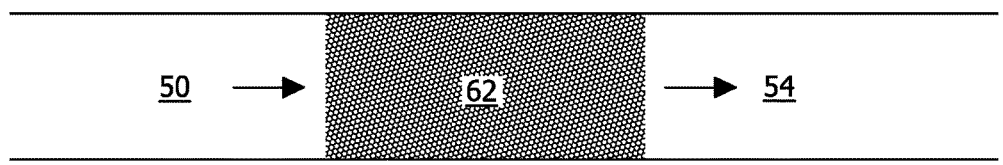
FIG. 10 shows a desiccant tuning the melting point of a salt hydrate in a thermal energy storage system.

FIG. 10 shows another configuration of the phase change composition 22 with respect to a desiccant 62. Moisture is removed from the phase change composition 22 by flowing the phase change composition 22 through the desiccant 62. When the phase change composition 22 flows through the desiccant 62, some of the contained moisture is absorbed by the desiccant 62, and the salt at the first hydration level 50 transforms to the salt at the second hydration level 54 with a higher melting point. In this case, besides choosing an inert desiccant 62, the retention time of the hydrated salt in the desiccant 62 is calculated based on the performance efficiency of the desiccant 62 and the targeted hydration level for the phase change composition 22.

Still referring to FIG. 10, the desiccant 62 is tuning the melting point of the phase change composition 22, because the salt at the first hydration level 50 on the left has a lower melting point than the salt at the second hydration level 54 on the right. The phase change composition 22 is flowing through the desiccant 62, and a desired amount of the moisture is captured from the salt at the first hydration level 50 by the desiccant 62, and the phase change composition 22 is tuned to the lower hydration form of the salt at the second hydration level 54 with a higher melting point.

In addition to the tuning fluids and desiccants 62 described above, the tuning medium 58 may alternatively be liquid water, steam, vaporized water from the phase change composition 22 generated by heating the phase change composition 22, liquid water condensed by cooling from ambient water vapor, or a partial vacuum applied to the phase change composition 22. In some embodiments, the tuning medium 58 and the phase change composition 22 may be separated by a water-permeable barrier.

A thermal energy storage system 20 as disclosed herein may be used in any type of heat exchange system. Although a thermal energy storage system 20 is primarily described as a heat sink herein, a thermal energy storage system 20 may alternatively be used as a heat source to heat a target object or fluid.

In some embodiments, the phase change composition 22 may include one or more nucleating agents to aid in solidification of the phase change composition 22 and prevent the phase change composition 22 from supercooling and remaining a liquid below its melting temperature.

EXAMPLE

The invention is further described in the context of the following example which is presented by way of illustration, not of limitation. This example demonstrates the commercial benefits of using a tunable phase change composition 22 in a dry cooling system 10. It is a cost analysis for using a tunable phase change composition 22 in the dry cooling of a power plant in Las Vegas. The result shows that a tunable phase change composition 22 with a wide working range is able to effectively reduce costs associated with loss of efficiency.

To quantify the benefit of the tunable phase change composition 22, the data from a power plant in Las Vegas area (Walter M. Higgins Generating Station, 530 MW nominal power generation) was taken to evaluate the costs due to the loss of efficiency in four cases—a dry cooling system 10 without any phase change composition 22 (No PCM), a dry cooling system 10 coupled with a phase change composition 22 having a melting point of 29° C. (29C PCM), a dry cooling system 10 coupled with a phase change material having a melting point of 39° C. (39C PCM), and a dry cooling system 10 coupled with a phase change composition 22 having a melting point that is tunable between 29° C. and 39° C. (Tunable PCM).

To simplify the analysis, a few assumptions were made. The daytime and nighttime temperatures in May, August, and September were approximated to be 30° C. and 20° C., respectively. The daytime and nighttime temperatures in June and July were approximated to be 40° C. and 30° C., respectively. A 20° C. Initial Temperature Difference (ITD) was assumed to be needed for the air-cooled heat exchanger 18 to dissipate the heat captured from steam to the ambient, and a 10° C. temperature drive was assumed to be needed to transfer heat to the phase change composition 22 of the thermal energy storage system 20. The efficiency loss for 40° C., 50° C., and 60° C. steam was approximated to be 0%, 3%, and 9%, respectively. The cost of electricity was approximated to be $0.10 per kWh.

The money loss was calculated via the following equation:

Money Loss=/months (Nominal Power (530 MW)× Monthly % of Peak Load×Monthly Efficiency Loss×Cost of Electricity).

Figure 11:
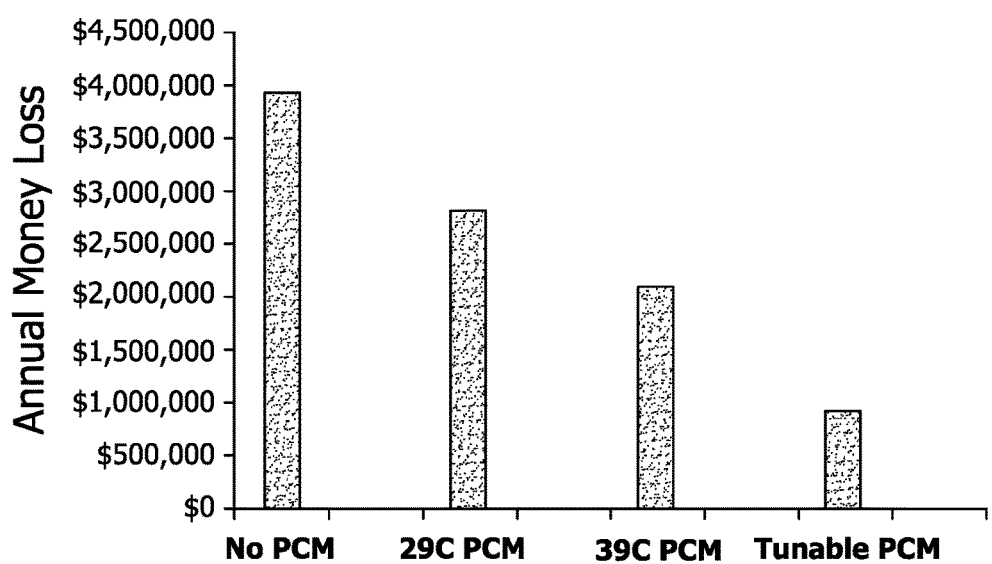
FIG. 11 shows estimated costs due to efficiency loss in various thermal energy storage systems.

Based on the aforementioned assumptions and equation, the estimated money loss per year for the four cases, is shown in FIG. 11. It can be seen that the Tunable PCM system is able to significantly reduce the loss of efficiency, thus reducing the money loss by almost 75% compared with the No PCM system, more than 50% compared with the 29 PCM system, and nearly 50% compared with the 39C PCM system.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A thermal energy storage system comprising:
    a phase change composition comprising a phase change material, the phase change composition having a first melting temperature at a first hydration level and a second melting temperature at a second hydration level, the phase change composition storing thermal energy by converting from a solid to a liquid;
    at least one compartment containing the phase change composition;
    at least one tuning medium entering the at least one compartment through an inlet and interacting with the phase change composition in the at least one compartment, the at least one tuning medium including water to adjust the phase change composition from the first hydration level to the second hydration level and supplying water to adjust the phase change composition from the second hydration level to the first hydration level; and
    a heat transfer fluid circulating and in a heat exchange relationship with a heat source, the phase change composition in the at least one compartment, and a heat sink.

2. The thermal energy storage system of claim 1, wherein the phase change material comprises a hydratable salt selected from the group consisting of: $LiClO_3$, $K_2HO_4$, KF, $Mn(NO_3)_2$, $LiBO_2$, $FeBr_3$, $CaCl_2$, $LiNO_3$, $Na_2SO_4$, $Na_2CO_3$, $KFe(SO_4)_2$, $CaBr_2$, LiBr, $Na_2HPO_4$, $Zn(NO_3)_2$, $FeCl_3$, $CoSO_4$, $CuSO_4$, $MgI_2$, $CaI_2$, $Ca(NO_3)_2$, $K_3PO_4$, $Fe(NO_3)_3$, $Na_2SiO_3$, $Na_2S_2O_3$, $K_2HPO_4$, $MgSO_4$, $Co(NO_3)_2$, $Ni(NO_3)_2$, $MnCl_2$, $CH_3COONa$, $LiCH_3COO$, $MgCl_2$, $NaCH_3COO$, $Cd(NO_3)_2$, $Fe(NO_3)_2$, $NaAl(SO_4)_2$, $FeSO_4$, $Na_3PO_4$, $Na_2B_4O_7$, $Na_2P_2O_7$, $Al(NO_3)_2$, $Ba(OH)_2$, $Al_2(SO_4)_3$, $Sr(OH)_2$, $Mg(NO_3)_2$, $KAl(SO_4)_2$, $(NH_4)Al(SO_4)$, $Na_2S$, and LiCl.

3. The thermal energy storage system of claim 1, wherein the phase change composition comprises a mixture of a first non-water component and at least one second non-water component.

4. The thermal energy storage system of claim 1, wherein the phase change composition comprises a mixture selected from the group consisting of: $NaCl+KCl+H_2O$, $Na_2SO_4+NaCl+KCl+H_2O$, and $Na_2SO_4+NaCl+H_2O$.

5. The thermal energy storage system of claim 1, wherein the phase change composition further comprises at least one nucleating agent.

6. The thermal energy storage system of claim 1, wherein the tuning medium comprises a tuning fluid having a controlled humidity in communication with the phase change composition, wherein the controlled humidity is selected to provide a predetermined amount of water to convert the phase change composition from the first hydration level to the second hydration level or from the second hydration level to the first hydration level.

7. The thermal energy storage system of claim 6, wherein the tuning fluid contacts the phase change composition by flowing through the phase change composition.

8. The thermal energy storage system of claim 1, wherein the tuning medium comprises a tuning fluid selected from the group consisting of liquid water, steam, and a carrier gas carrying water vapor, the carrier gas being selected from the group consisting of air, nitrogen, and oxygen.

9. The thermal energy storage system of claim 1 further comprising a water-permeable barrier between the tuning medium and the phase change composition.

10. The thermal energy storage system of claim 1, wherein during tuning of the phase change composition, the phase change composition and the tuning medium are arranged in a relationship selected from the group consisting of the tuning medium flowing to the phase change composition, the phase change composition flowing to the tuning medium, the phase change composition being sprayed into the tuning medium as drops of the phase change composition contacting the tuning medium, and the tuning medium flowing through capsules of the phase change composition packed and encapsulated in the capsules.

11. The thermal energy storage system of claim 1 further comprising at least one inlet and at least one outlet in the compartment through which the tuning medium travels.

12. The thermal energy storage system of claim 1, wherein the tuning medium comprises vaporized water from the phase change composition generated by heating the phase change composition.

13. The thermal energy storage system of claim 1, wherein the tuning medium comprises water condensed from ambient water vapor.

14. The thermal energy storage system of claim 1, wherein the at least one tuning medium further comprises a partial vacuum contacting the phase change composition.

15. The thermal energy storage system of claim 1, wherein the at least one tuning medium further comprises a desiccant.

16. The thermal energy storage system of claim 15, wherein the desiccant is immersed in the phase change composition, the desiccant is located above the phase change composition, or the phase change composition flows through the desiccant.

17. The thermal energy storage system of claim 1, wherein the phase change composition is in at least a partial solid state when being adjusted between the first hydration level and the second hydration level.

18. The thermal energy storage system of claim 1 further comprising at least one agitator in the compartment.

19. A method of storing and releasing thermal energy in the apparatus of claim 1, the method comprising:
    applying a first season heat load to a phase change composition at a first hydration level during a first season, the phase change composition at the first hydration level having a first melting temperature and at a second hydration level having a second
melting temperature, the first season having an average nighttime temperature below the first melting temperature but above the second melting temperature, the first season heat load melting the phase change composition to store thermal energy;

regenerating the phase change composition at the first hydration level during the first season by releasing thermal energy from the phase change composition to ambient at nighttime;

adjusting the phase change composition from the first hydration level to the second hydration level;

applying a second season heat load to the phase change composition at the second hydration level during a second season, the second season having an average nighttime temperature below the second melting temperature, the second season heat load melting the phase change composition to store thermal energy;

regenerating the phase change composition at the second hydration level during the second season by releasing thermal energy from the phase change composition to ambient at nighttime; and adjusting the phase change composition from the second hydration level to the first hydration level.

\* \* \* \* \*